United States Patent
Yang

[11] Patent Number: 6,055,773
[45] Date of Patent: May 2, 2000

[54] TIRE PLANTER WITH FRAME

[76] Inventor: Ming-Mou Yang, No. 5, Ming-Li Rd., Kao-Lang Village, Yen-Pu Hsiang, Pingtung Hsien, Taiwan

[21] Appl. No.: 09/303,651

[22] Filed: May 3, 1999

[51] Int. Cl.⁷ ................................................ A01G 9/02
[52] U.S. Cl. ............................... 47/902; 47/901; 47/65.5; 428/36.8; 119/61
[58] Field of Search ........................ 47/65.5, 901, 902; 366/226; 428/36.8; 119/61

[56] References Cited

U.S. PATENT DOCUMENTS

| | | | |
|---|---|---|---|
| 3,038,512 | 6/1962 | Staton | 47/65.7 |
| 3,074,377 | 1/1963 | Spencer | 119/61 |
| 4,364,335 | 12/1982 | Livingston | 119/61 |
| 5,095,651 | 3/1992 | Figueroa | 47/65.7 |
| 5,236,756 | 8/1993 | Halliburton | 428/36.8 |
| 5,267,662 | 12/1993 | Hayes | 119/61 |
| 5,479,882 | 1/1996 | Kerner | 119/61 |
| 5,845,992 | 12/1998 | MacKelvie | 366/226 |

*Primary Examiner*—Michael J. Carone
*Assistant Examiner*—Daniel Beitey
*Attorney, Agent, or Firm*—Rosenberg, Klein & Lee

[57] ABSTRACT

A vase includes a tire and one of the two sidewalls of the tire is cut into multiple partitions, a board connected to the other sidewall and, a frame fixedly connected to the partitions. The frame has a neck to be fixedly connected to the partitions by bolts, and a plurality lugs extend from the neck, wherein each lug is located between adjacent partitions. A plurality of plates are attached to the outside of the sidewall and are fixedly connected to the lugs by bolts. Soil is filled between the partitions, the board and the frame, and a plant is planted in the soil.

5 Claims, 5 Drawing Sheets

TIRE PLANTER WITH FRAME

FIELD OF THE INVENTION

The present invention relates to a vase composed of a used tire with a board connected to one of two sides thereof and a frame connected to the other side of the tire. Soil is received in the frame and a plant is planted in the soil.

BACKGROUND OF THE INVENTION

The used tires are generally piled up and placed on the ground. Rain collects in the used tires and mosquitoes lay their eggs in the water in the tires so that larvae hatch and grow in the water. Mosquitoes carry many germs, some which can cause fatal diseases in people. How to deal with the used tires so as to reduce the quantity of mosquitoes is an urgent necessity especially in the tropical countries. Furthermore, some people burn the used tires to get rid of them. However, burning the used tires produces toxic gas that can result in sickness or death to nearby residents.

The present invention intends to provide a vase composed of a used tire. A board closes the bottom of the tire and a frame is connected to the top of the tire so that soil can be filled in the used tire and a planet is planted in the soil. By converting a used tire to a vase, the used tires can be recycled for another purpose, and the numbers of breeding places for mosquitos can be reduced.

SUMMARY OF THE INVENTION

In accordance with one aspect of the present invention, a vase comprises a tire having a first side and a second side that is closed by a board. The first sidewall of the tire is cut into multiple partitions, and a frame has its neck fixedly engaged with the partitions. A flange extends radially outward from the neck.

The main object of the present invention is to provide a vase made by recycling a used tire.

Another object of the present invention is to reduce randomly discarded used tires.

Further objects, advantages, and features of the present invention will become apparent from the following detailed description with appropriate reference to the accompanying drawings.

DETAILED DESCRIPTION OF THE PREFERRED EMBODIMENT

Figure 1:
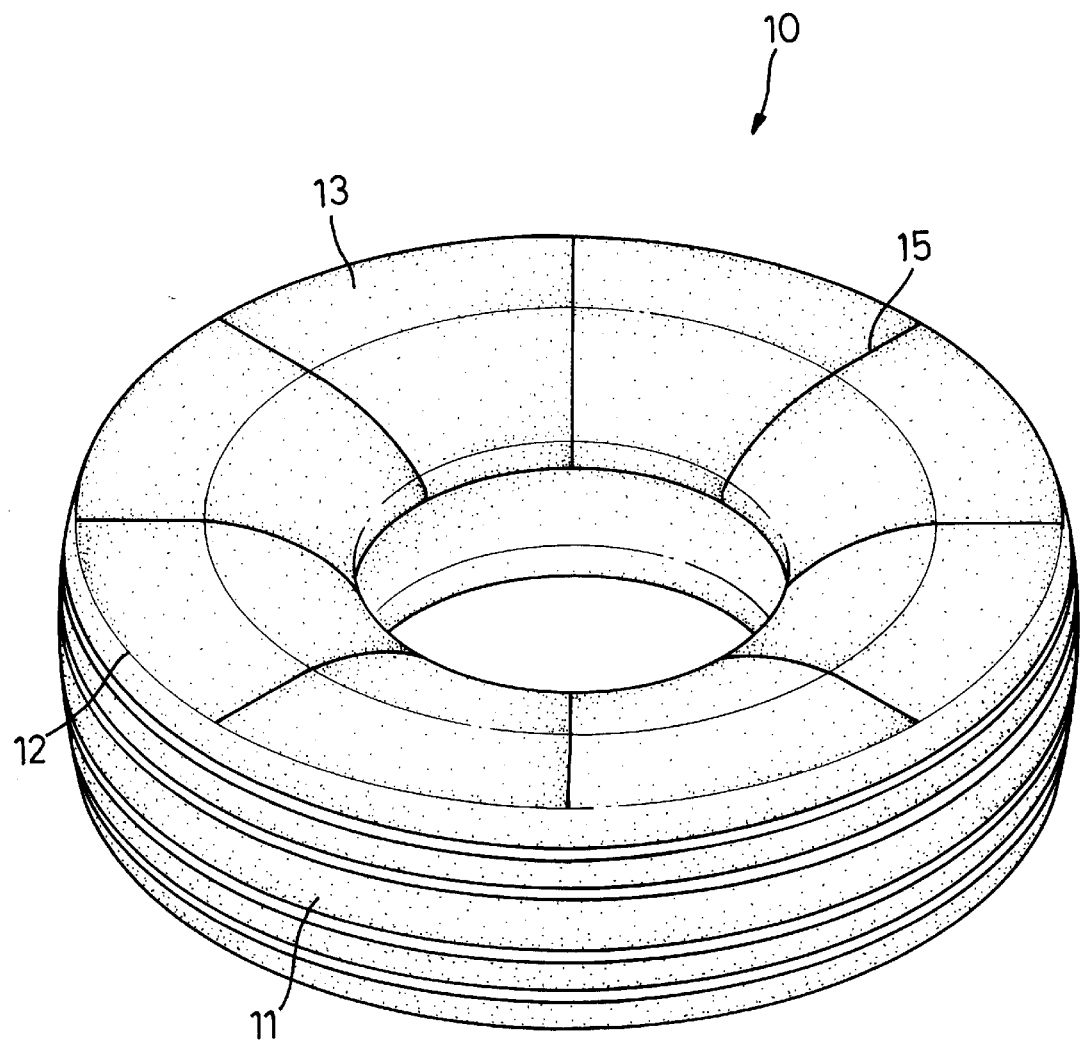
FIG. 1 is a perspective view of a used tire with multiple slits defined in the first sidewall in accordance with the present invention.
Figure 2:
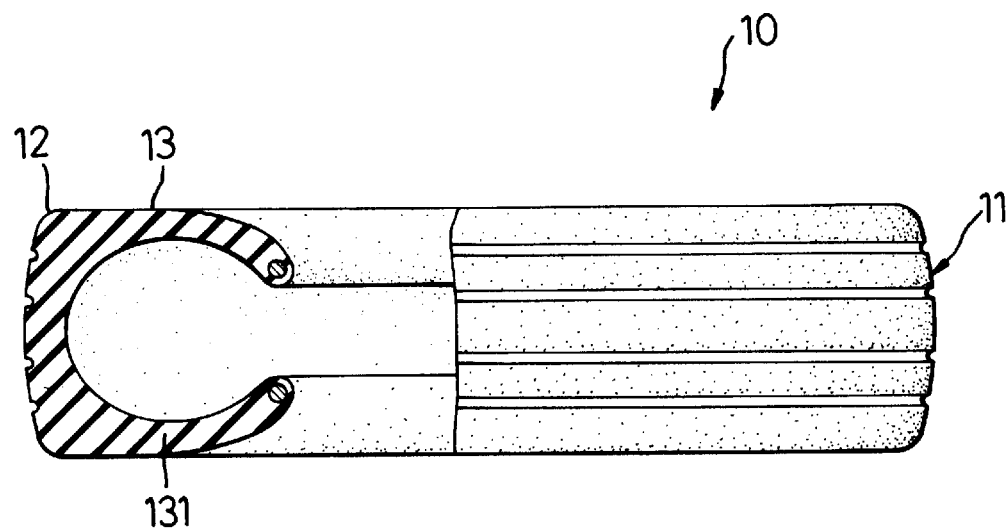
FIG. 2 is a side elevational view, partly in section, of the used tire in accordance with the present invention.
Figure 3:
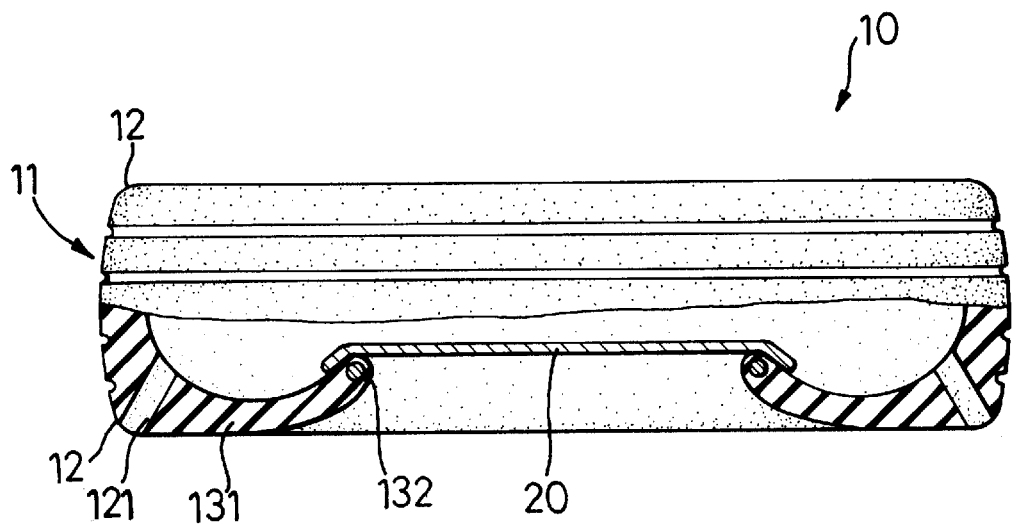
FIG. 3 is a side elevational view, partly in section, of the used tire in accordance with the present invention wherein a plurality of passages are defined through the tread and a board is connected to the inner rim of the second sidewall.
Figure 4:
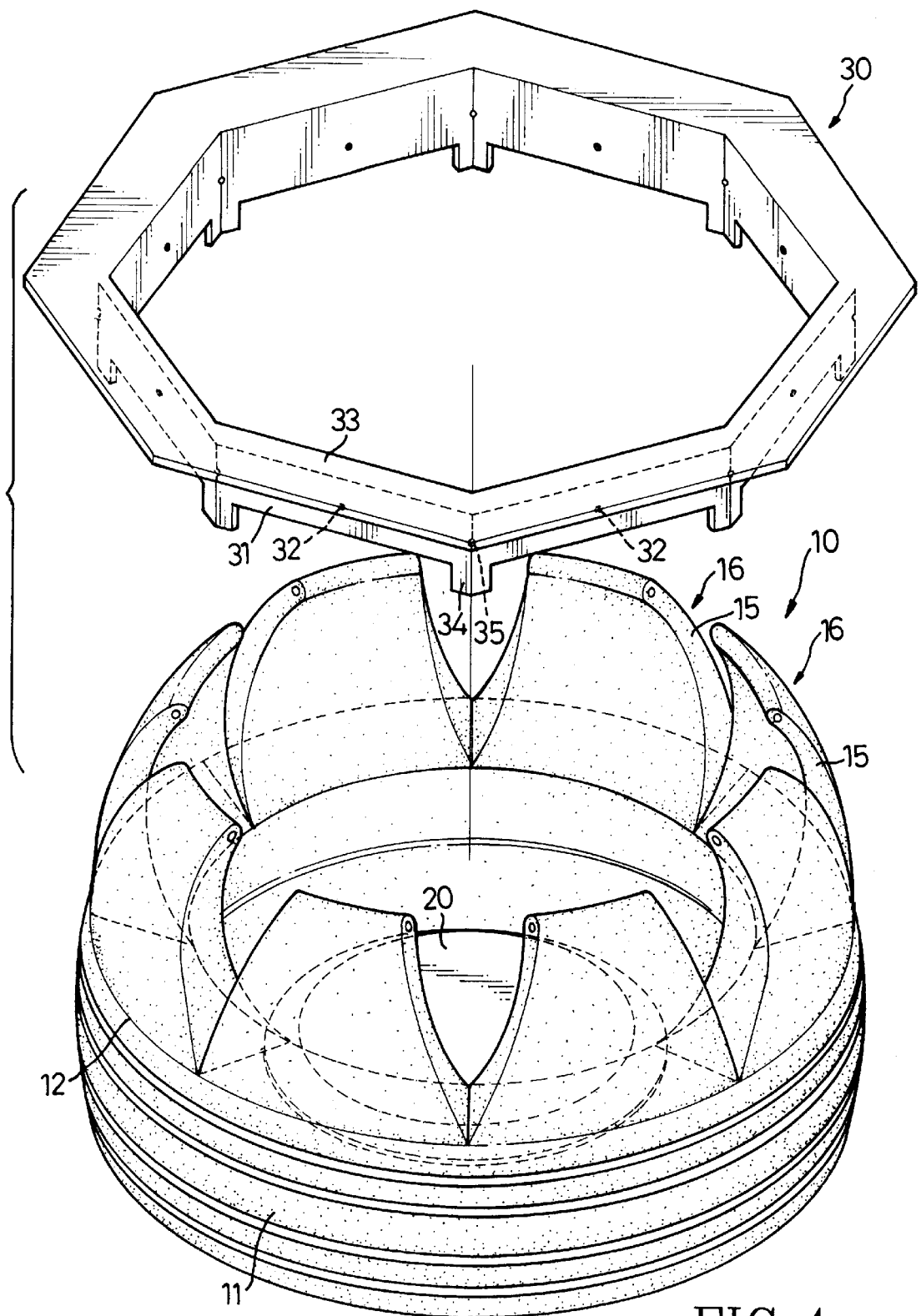
FIG. 4 is an exploded view of the used tire and the frame in accordance with the present invention.

Referring to FIGS. 1 to 4, the vase in accordance with the present invention comprises a tire (10) having a tread (11), a first sidewall (13) and a second sidewall (131), wherein the first sidewall (13) is radially cut to multiple slits (15) defined in the first sidewall (13) to separate the first sidewall (13) into multiple partitions (16). Each of the partitions (16) is pulled upward as shown in FIG. 4. A board (20) is connected to the inner rim (132) of the second sidewall (131) of the used tire (10), and multiple passages (121) are defined inclinedly through the shoulder (12) connected between the second sidewall (131) and the tread (11) of the used tire (10).

Figure 5:
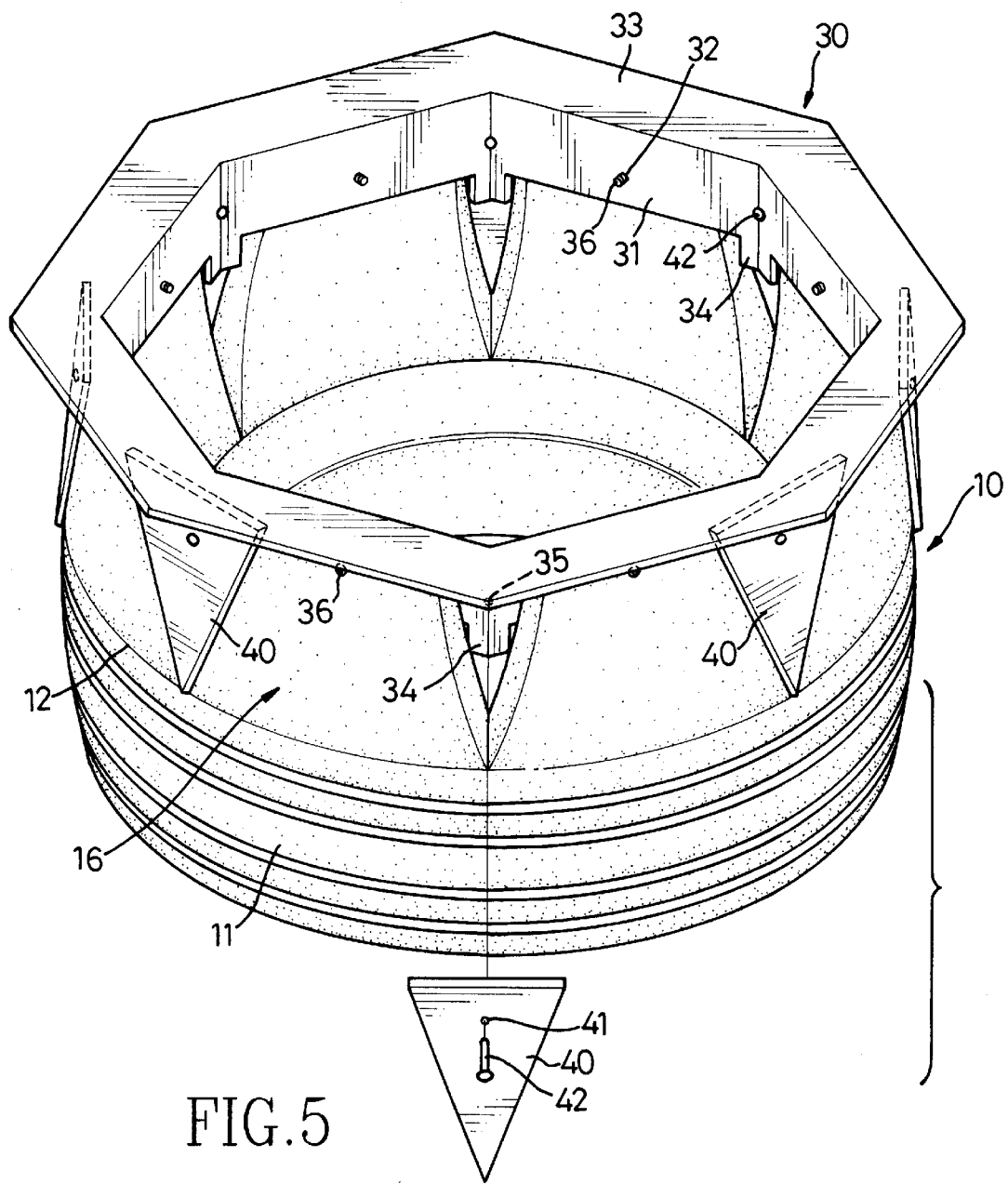
FIG. 5 is an exploded view of the vase in accordance with the present invention and one of the plates.
Figure 7:
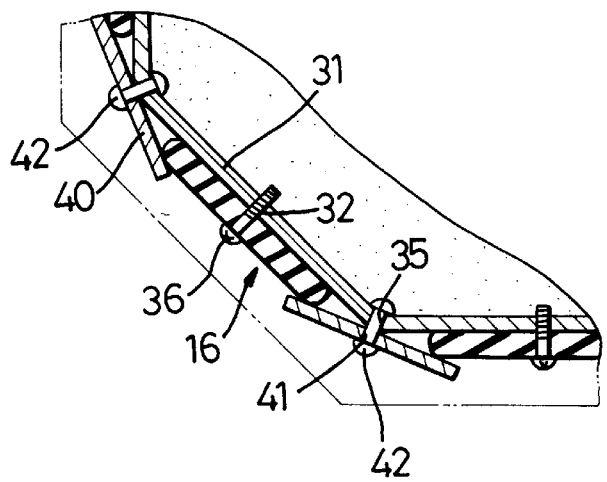
FIG. 7 is a sectional view to show how the plates are connected to the lugs extending from neck of the frame in accordance with the present invention.
Figure 6:
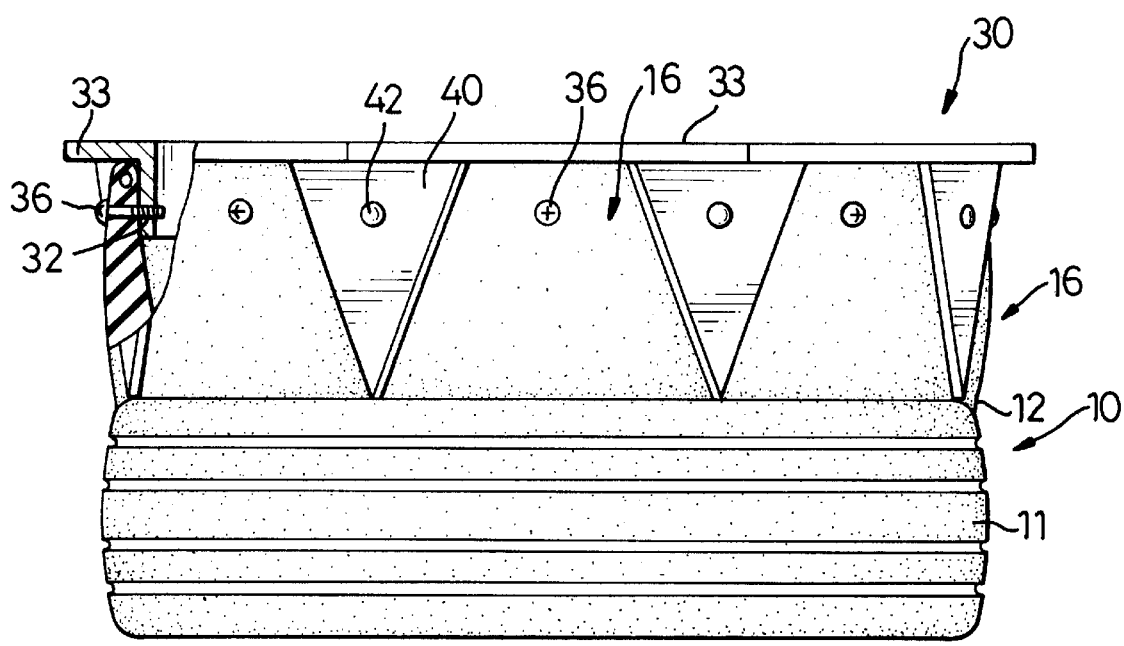
FIG. 6 is a sectional view to show how the partitions are connected to the neck of the frame in accordance with the present invention.

Further referring to FIG. 5, a frame (30) has a neck (3 1) fixedly engaged with the partitions (16), and a flange (33) extends radially outward from the neck (31). As shown in FIG. 6, the neck (31) has holes (32) defined therethrough and bolts (36) extend through the partitions (16) and are fixedly engaged with the holes (32). Lugs (34) extend from the neck (31) so that a lug (34) is located between adjacent partitions (16) of the tire (10). Each lug (34) has a hole (35) defined therethrough and a plurality of plates (40) are attached to the outside of the first sidewall (13), wherein a bolt (42) extends through the hole (41) defined through each plate (40) and the hole (35) in each lug (34) so as to securely connect the plate (40) to the corresponding lug (34) as shown in FIG. 7. Therefore, the gaps defined between adjacent partitions (16) are covered by the plates (40).

Soil (not shown) is filled in the space defined between the frame (30), the used tire (10) and the board (20) so that a plant (not shown) can be planted in the soil. The passages (121) allow excess water to drain from the passages (121). The vase of the present invention can be carried or moved by holding the flange (33).

Although the invention has been explained in relation to its preferred embodiment, it is to be understood that many other possible modifications and variations can be made without departing from the spirit and scope of the invention as hereinafter claimed.

What is claimed is:

1. A vase comprising:

a tire (10) having a tread (11), a first sidewall (13) and a second sidewall (131), a plurality of slits (15) defined radially in said first sidewall (13) of said tire (10) to separate said first sidewall (13) into a plurality of partitions (16);

a board (20) fixedly connected to said second sidewall (131) of said tire (10); and a frame (30) having a neck (31) fixedly engaged with said partitions (16) and a flange (33) extending radially outward from said neck (31), said neck (31) having multiple holes (32) defined therethrough and bolts (36) extending through said partitions (16) and fixedly engaged with said holes (32).

2. The vase as claimed in claim 1 further comprising multiple lugs (34) extending from said neck (31) so that a lug (34) is located between adjacent partitions (16) of said tire (10).

3. The vase as claimed in claim 2 further comprising a plurality of plates (40), each plate (40) attached to the outside of said first sidewall (13) and connected to said lug (34) corresponding to said plate (40).

4. The vase as claimed in claim 1 further comprising multiple passages (121) defined through a shoulder (12) connected between said second sidewall (131) and said tread (11) of said used tire (10).

5. The vase as claimed in claim 1, wherein said board (20) is connected to the inner rim of said second sidewall (131) of said used tire (10).

* * * * *